March 18, 1952    R. E. CARTER ET AL    2,589,772
CARRIER FOR USE ON TOP OF AUTOMOBILES
Filed Feb. 4, 1949    2 SHEETS—SHEET 1
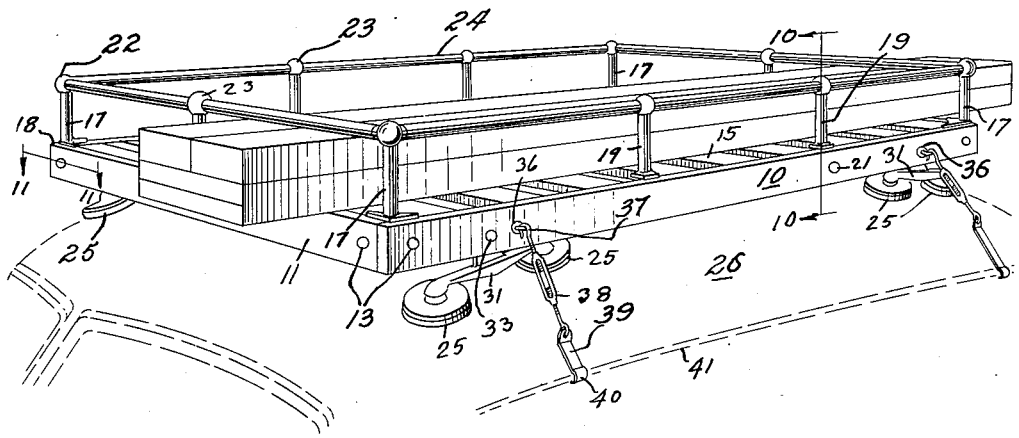
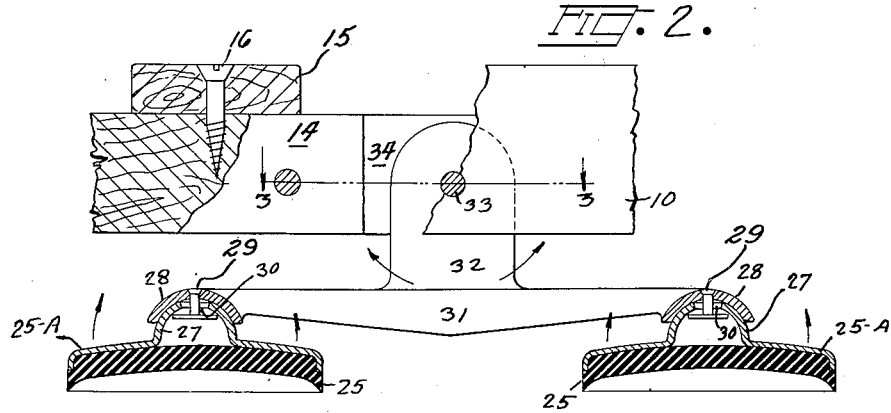
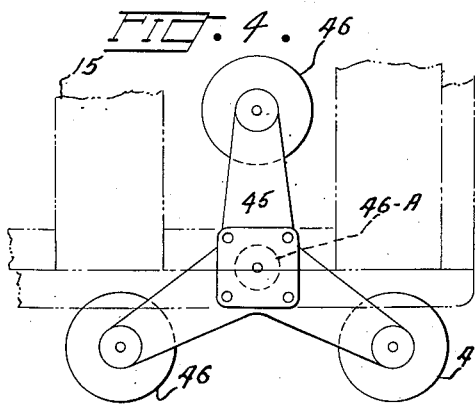
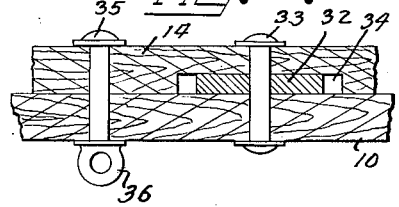
INVENTORS
RUSSELL E. CARTER
HARRY A. CARTER
ATTORNEY March 18, 1952     R. E. CARTER ET AL     2,589,772

CARRIER FOR USE ON TOP OF AUTOMOBILES

Filed Feb. 4, 1949     2 SHEETS—SHEET 2

INVENTORS
RUSSELL E. CARTER
HARRY A. CARTER

BY

ATTORNEY

Patented Mar. 18, 1952

2,589,772

UNITED STATES PATENT OFFICE 2,589,772

CARRIER FOR USE ON TOP OF AUTOMOBILES

Russell E. Carter and Harry A. Carter,
Portland, Oreg.

Application February 4, 1949, Serial No. 74,598

1 Claim. (Cl. 224—42.1)

This invention relates generally to automobiles and particularly to a carrier for use on top of an automobile.

The main object of this invention is to provide a carrier which can be mounted on the top of any automobile without in anyway altering or disfiguring the top or subjecting it to any strains for which it was not intended.

The second object is to provide an improved form of support for the carrier by means of which the load is distributed over a relatively large area where the car top is best able to sustain it and in a manner that the support will adapt itself to the shape of the top and causing equal pressure to bear on all of the feet in each group.

The third object is to provide a carrier which is extremely sturdy in construction and which lends itself to a wide variety of uses.

These and other objects are accomplished in a manner set forth in the following specification as illustrated in the accompanying drawings, in which:

Fig. 1 is a perspective view of the carrier showing it in place on a car top.

Fig. 2 is an enlarged fragmentary view in partial section showing the self-seating feet.

Fig. 3 is a section taken along the line 3—3 in Fig. 2.

Fig. 4 is a plan of a modified form of the support in which a tripod form of foot is employed.

Like numbers of reference refer to the same or similar parts throughout the several views.

Figure 5:
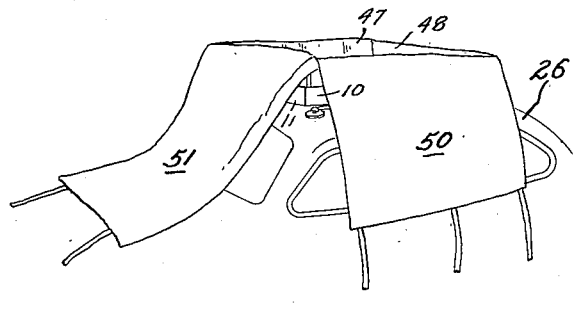
Fig. 5 is a perspective view showing an open water-proof covering placed inside of the carrier ready to receive baggage.
Figure 9:
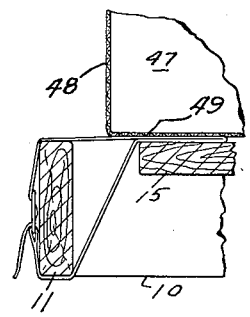
Fig. 9 is a section taken along the line 9—9 in Fig. 6.

Referring in detail to the drawings, there is shown a rectangular frame composed of the sills 10 and ends 11 which are joined at the corners by the angle plates 12 and bolts 13.

On the inner sides of the sills 10 are secured the strips 14 upon which rest the slats 15, each of which is secured to the strips 14 by means of the screws 16. The top surface of the slats 15 is flush with the top surfaces of the sills 10 and ends 11.

At each corner of the carrier is an upright post 17 whose feet 18 are integral with the angle plates 12.

Along the sills 10 and ends 11 are placed the intermediate posts 19 having the downwardly extending tongues 20 which are clamped between the members 10 and 11 by the bolts 21.

Rail fittings 22 and 23 are provided on the upper ends of the posts 17 and 19 and the rail 24 extends around the carrier through the fittings 22 and 23.

In order to mount the carrier to the best advantage, we have provided a special form of foot, of which the preferred form is shown in Fig. 2, and consisting of a pair of rubber bearing pads 25 capable of adhering to the car top 26.

Each pad 25 is provided with a metallic backing 25-A, the middle of which is a half-ball 27 which fits into a rounded socket 28. The ball 27 and socket 28 are joined by the rivets 29 which pass through the large opening 30 in the ball 27, allowing a limited rocking motion of the pad 25. The sockets 28 are joined by the base 31, at the middle of which is formed an upturned standard 32 which is hinged on the rivet 33 which passes through the sill 10 and the strip 14, in the latter of which is formed a slot 34 whicht provides room for a limited movement of the standard 32 on its rivet 33.

Eye bolts 35 also extend through the sills 10 and are provided with perforated heads 36, each of which receive the hook 37 of a turn buckle 38 which is attached to a strap 39, at the end of which is formed a hook 40 which engages the bead 41 of the car top 26.

It can be seen that, when the pads 25 rest on the top 26 and the hooks 40 made to engage the bead 41 and the turnbuckles 38 tightened, the entire carrier is firmly seated and secured on the car top without marring the car or danger of becoming loose.

Figure 7:
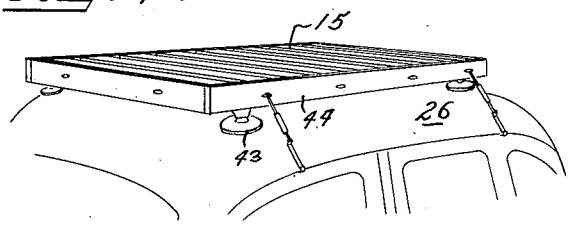
Fig. 7 is a perspective view showing a simple modification without side rails and employing single supporting feet.
Figure 11:
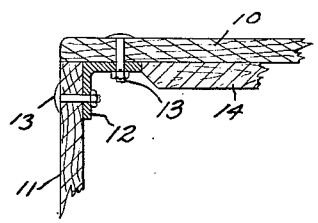
Fig. 11 is a section taken along the line 11—11 in Fig. 1.

In Fig. 7 is shown a single form of foot 43 supporting the sills 44 but the single form is inferior to the double form previously described for the reasons stated.

In Fig. 4 is shown a tripod 45 having the three bearing pads 46 which have ball and socket mountings as shown in Fig. 2.

It is desirable to make the central connector 46-A of the tripod in the form of a ball and socket to enable the tripod 45 to adapt itself to any shape of car top. Means for preventing rotation of the tripod may be employed to hold one pair of pads outermost.

Figure 6:
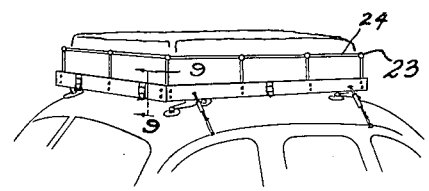
Fig. 6 is a perspective view showing the baggage enclosed in the water-proof covering.
Figure 10:
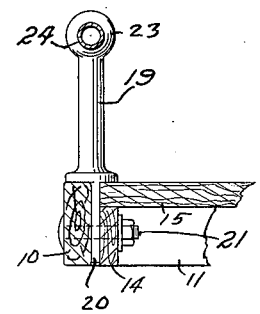
Fig. 10 is a section taken along the line 10—10 in Fig. 1.

It will be noted in Figs. 5 and 6 that there is provided a flexible box-like luggage carrier whose sides 47 and 48 fit inside of the rail 24 and extend down to the flexible bottom 49. A flap 50 is secured to each side 47 and a flap 51 is secured to a side 48 in order that the luggage can be protected against the weather when travelling.

Figure 8:
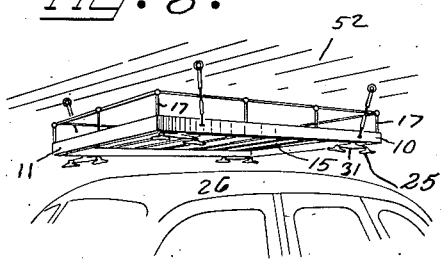
Fig. 8 is a perspective view illustrating the manner in which the device is slung from the ceiling of the garage when not needed on the car.

In Fig. 8 the carrier is shown suspended from the garage ceiling 52 where it is held free of the car top 26 until its use is required.

We claim:

In a support for luggage carriers a supporting standard having its upper end provided with a hinge joint and having a base rigidly secured to the lower end of said standard and having a plurality of spaced feet tiltably mounted on the under side of said base in a plane normal to the hinge axis, each of said feet having a bearing pad on its under side adapted to engage the surface of a car top and to conform to the contour thereof.

RUSSELL E. CARTER.
HARRY A. CARTER.

REFERENCES CITED

The following references are of record in the file of this patent:

UNITED STATES PATENTS

| Number | Name | Date |
| --- | --- | --- |
| 947,751 | Long et al. | Jan. 25, 1910 |
| 952,495 | Austin | Mar. 22, 1910 |
| 1,006,315 | Toth | Oct. 17, 1911 |
| 1,610,081 | Feldman | Dec. 7, 1926 |
| 2,028,640 | Zaiger | Jan. 21, 1936 |
| 2,109,571 | Le Boeuf | Mar. 1, 1938 |
| 2,235,012 | Colvin | Mar. 18, 1941 |
| 2,469,987 | Pilsner | May 10, 1949 |

FOREIGN PATENTS

| Number | Country | Date |
| --- | --- | --- |
| 776,636 | France | Nov. 8, 1934 |
| 789,793 | France | Aug. 26, 1935 |
| 98,070 | Sweden | Feb. 13, 1940 |